United States Patent
Capasso et al.

(10) Patent No.: US 10,757,045 B2
(45) Date of Patent: *Aug. 25, 2020

(54) DIFFERENTIATION OF MESSAGES FOR RECEIVERS THEREOF

(71) Applicant: International Business Machines Corporation, Armonk, NY (US)

(72) Inventors: Andrea Alfonso Capasso, Rome (IT); Filomena Ferrara, Rome (IT); Stefano Proietti, Rome (IT); Antonio Mario Sgro, Rome (IT)

(73) Assignee: International Business Machines Corporation, Armonk, NY (US)

(*) Notice: Subject to any disclaimer, the term of this patent is extended or adjusted under 35 U.S.C. 154(b) by 566 days.

This patent is subject to a terminal disclaimer.

(21) Appl. No.: 14/245,096

(22) Filed: Apr. 4, 2014

(65) Prior Publication Data
US 2014/0359030 A1 Dec. 4, 2014

(30) Foreign Application Priority Data

May 28, 2013 (GB) .................................. 1309468.5

(51) Int. Cl.
*H04L 12/58* (2006.01)
*H04L 12/24* (2006.01)
*G06Q 10/10* (2012.01)

(52) U.S. Cl.
CPC ........... *H04L 51/046* (2013.01); *G06Q 10/10* (2013.01); *H04L 41/026* (2013.01);
(Continued)

(58) Field of Classification Search
CPC ..... H04L 51/046; H04L 51/063; H04L 51/18; H04L 41/026; H04L 41/0266; G06Q 10/10

See application file for complete search history.

(56) References Cited

U.S. PATENT DOCUMENTS 4,456,973 A 6/1984 Carlgren et al.
6,489,950 B1 * 12/2002 Griffin ................ G06F 1/1626
200/11 TW
(Continued)

FOREIGN PATENT DOCUMENTS

EP 0093250 A3 3/1984
EP 1271971 B1 5/2006
(Continued)

OTHER PUBLICATIONS

Intellectual Property Office; Patents Act 1977: Search Report under Section 17(5); dated Dec. 6, 2013.

*Primary Examiner* — Patrice L Winder
*Assistant Examiner* — Angela M Widhalm De Rodrig
(74) *Attorney, Agent, or Firm* — Kenneth Han (57) ABSTRACT

A solution for sending messages on a data-processing system is proposed. A corresponding method comprises upon a message to be sent from a sender to at least one receiver being submitted, parsing the message to identify an original expression therein matching an indication of one of a set of pre-defined concepts, determining, for the receiver, a preferred expression of the matched concept, among the corresponding original expression and a set of candidate expressions pre-defined to express the matched concept, according to a rating thereof representing an expected understanding by the receiver, processing the message for the receiver by replacing the original expression according, to the corresponding preferred expression for the receiver, and sending the processed message to the corresponding receiver.

8 Claims, 5 Drawing Sheets

(52) U.S. Cl.
CPC ........ *H04L 41/0266* (2013.01); *H04L 51/063* (2013.01); *H04L 51/18* (2013.01)

(56) References Cited

U.S. PATENT DOCUMENTS

| | | | | |
|---|---|---|---|---|
| 6,839,669 | B1* | 1/2005 | Gould | G10L 15/22 704/246 |
| 7,043,690 | B1* | 5/2006 | Bates | G06F 17/278 715/234 |
| 7,111,237 | B2* | 9/2006 | Chan | G06F 17/241 707/999.004 |
| 7,167,825 | B1* | 1/2007 | Potter | H04L 9/065 380/42 |
| 7,415,100 | B2* | 8/2008 | Cooper | H04M 3/527 379/88.01 |
| 7,570,814 | B2* | 8/2009 | Moriya | G06F 17/30265 382/100 |
| 7,904,594 | B2* | 3/2011 | Spicer | H04L 12/5835 709/246 |
| 8,239,455 | B2 | 8/2012 | Wang | |
| 8,706,472 | B2* | 4/2014 | Ramerth | G06F 40/53 704/2 |
| 8,774,867 | B2* | 7/2014 | Oono | H04M 1/576 382/115 |
| 8,856,246 | B2* | 10/2014 | Post | G06Q 10/107 709/205 |
| 8,892,580 | B2* | 11/2014 | Syrowitz | G06F 17/30985 706/12 |
| 8,977,953 | B1* | 3/2015 | Pierre | G06F 17/2785 715/201 |
| 9,223,987 | B2* | 12/2015 | Yoshihama | G06F 21/6245 |
| 9,304,712 | B2* | 4/2016 | White | G09B 17/00 |
| 9,535,900 | B2* | 1/2017 | Galvin, Jr. | G06F 17/241 |
| 2002/0173946 | A1* | 11/2002 | Christy | G06F 17/2872 704/2 |
| 2003/0003931 | A1 | 1/2003 | Silventoinen et al. | |
| 2003/0049592 | A1* | 3/2003 | Park | G09B 7/00 434/322 |
| 2005/0060643 | A1* | 3/2005 | Glass | G06F 17/241 715/205 |
| 2005/0065931 | A1* | 3/2005 | Ebrahimi | G06F 3/018 |
| 2005/0080642 | A1* | 4/2005 | Daniell | G06Q 10/107 709/206 |
| 2005/0108001 | A1* | 5/2005 | Aarskog | G06F 40/289 704/10 |
| 2005/0273365 | A1* | 12/2005 | Baumgartner | G06F 19/321 705/3 |
| 2006/0005247 | A1* | 1/2006 | Zhang | G06F 17/30616 726/26 |
| 2008/0059152 | A1 | 3/2008 | Fridman et al. | |
| 2008/0126481 | A1* | 5/2008 | Chakra | H04L 51/063 709/204 |
| 2008/0313534 | A1 | 12/2008 | Cheung et al. | |
| 2010/0113074 | A1* | 5/2010 | Sheppard | H04L 12/583 455/466 |
| 2010/0268682 | A1 | 10/2010 | Lewis et al. | |
| 2010/0316980 | A1* | 12/2010 | Pazushko | G09B 5/06 434/157 |
| 2010/0323332 | A1 | 12/2010 | Keim et al. | |
| 2011/0295593 | A1* | 12/2011 | Raghuveer | G06Q 10/10 704/9 |
| 2012/0245925 | A1* | 9/2012 | Guha | G06F 17/27 704/9 |
| 2012/0271640 | A1* | 10/2012 | Basir | H04M 1/6075 704/275 |
| 2013/0197898 | A1* | 8/2013 | Choi | G06F 17/289 704/3 |
| 2014/0046951 | A1* | 2/2014 | Redfern | G06F 16/3338 707/741 |
| 2014/0181229 | A1* | 6/2014 | Tucker | H04L 12/1827 709/206 |
| 2014/0359039 | A1 | 12/2014 | Capasso | |
| 2018/0082183 | A1* | 3/2018 | Hertz | G06Q 10/10 |

FOREIGN PATENT DOCUMENTS

| | | |
|---|---|---|
| EP | 2445594 A4 | 2/2015 |
| GB | 2520226 A | 7/2013 |
| WO | 2008021512 A3 | 11/2008 |
| WO | 2012145782 A1 | 11/2012 |
| WO | WO2012166099 A1 | 12/2012 |

* cited by examiner

FIG. 4B

DIFFERENTIATION OF MESSAGES FOR RECEIVERS THEREOF

TECHNICAL FIELD

The solution according to one or more embodiments of the claimed subject matter relates to the data-processing field. More specifically, this solution relates to the sending of messages on a data-processing system.

BACKGROUND

Messages are commonly used to exchange information among users on data-processing systems. A typical example is an electronic mail (e-mail) service, which allows exchanging e-mail messages (or simply e-mails) over a communication network (typically based on the Internet); the e-mail services make it possible to communicate anywhere in the world, thereby conveying information in a direct and immediate way.

Communication applications implementing the above-mentioned exchange of messages may be used for either personal purposes or business purposes. In the later case, the communication applications (together with other collaborative software, or groupware) contribute to define collaborative working environments (CWEs), wherein the users involved in common tasks collaborate among them to achieve their goals. This is of importance in modern organizations, wherein working in team is a key factor of their competitiveness. In this context, several techniques are known for facilitating the use of the messages; for example, in one technique the messages are analyzed to determine the context and meaning of a conversation, and linked contents relevant to the conversation are selected and associated with certain words or phrases in the messages.

However, sometimes the messages may be not completely effective in conveying the desired information to their receivers. Indeed, the actual significance of the messages (as intended by their sender users) may be distorted, misunderstood or not understood at all by the corresponding receivers.

The reduced effectiveness of the messages is typically due to the fact that the sender and receiver may interpret some expressions that are used in the messages with different meanings, or with no meaning at all (so that that may act on them in different ways).

An example of hindering factor that may undermine the effectiveness of the messages is the use of specialist expressions (such as of technical or legal nature), which may be very difficult to understand by receivers without the required skills. Another example of hindering factor is the use of jargon expressions relating to specific fields, which may be obscure to receivers alien to them. Another example of hindering factor is the use of context-depending expressions specific for particular situations (such as a meeting) or environments (such as a department), so that they may be incomprehensible to receivers without any relationship to them. Another example of hindering factor is the use of short expressions providing very poor explanations, which may be inappropriate for receivers without the required background. Another example of hindering factor is the use of ambiguous expressions that may have different meanings, so that they may be understood in different ways by the receivers.

In any case, the messages may be unable to generate the desired effects, at least in part, for which they were written (for example, causing actions, notifying events, communicating points of view, and the like); even worse, the messages may generate different or completely wrong effects as compared to the intended ones. This causes a failure of a corresponding communication processes, without the desired effects (or effects that are undesired).

Moreover, the messages that are not clear to the receivers may confuse them. In this case, the receivers typically request clarifications to the senders, which in turn have to respond to these requests of clarifications, and so on until the actual meaning of the messages have been completely clarified. However, this process is very time consuming and annoying for the users: moreover, it involves a proliferation of messages that are to be sent (and saved).

All of the above is exacerbated by the simplicity of use of the modern communication applications; indeed, this makes the writing of the messages faster and faster (especially for expert users, which tend to perform these operations almost mechanically), with a consequent reduction of the attention devoted to their content. Moreover, the substantially null cost of the corresponding services facilitates the proliferation of the receivers which the messages are sent to; this increases the likelihood of having receivers that are largely heterogeneous in the same messages.

SUMMARY

The solution according to one or more embodiments of the claimed subject mailer is based on the idea of differentiating the messages according to their receivers also referred to as target users.

Particularly, one or more aspects of the solution according to specific embodiments of the claimed subject matter are set out in the independent claims and advantageous features of the same solution are set out in the dependent claims, with the wording of all the claims that is herein incorporated verbatim by reference (with any advantageous feature provided with reference to a specific aspect of the solution according to an embodiment of the claimed subject matter that applies mutatis mutandis to every other aspect thereof).

More specifically, an aspect of the solution according, to an embodiment of the claimed subject matter provides a method for sending a message on a data-processing system; for the receiver of a message, the original expression therein (matching an indication of one of a set of concepts) is replaced according to a preferred expression, which preferred expression is determined among, the original expression and a set of candidate expressions (pre-defined to express the matched concept) according to a rating thereof representing an expected understanding by the receiver.

A further aspect of the solution according to an embodiment of the claimed subject matter provides a cot responding computer program (and a corresponding computer program product).

A further aspect of the solution according to an embodiment of the claimed subject matter provides a corresponding system.

BRIEF DESCRIPTION OF THE DRAWINGS

The solution according to one or more embodiments of the claimed subject mailer, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of the entity is generally used to denote both its type and its attributes—such as value, content and representation). Particularly:

DETAILED DESCRIPTION

Figure 1:
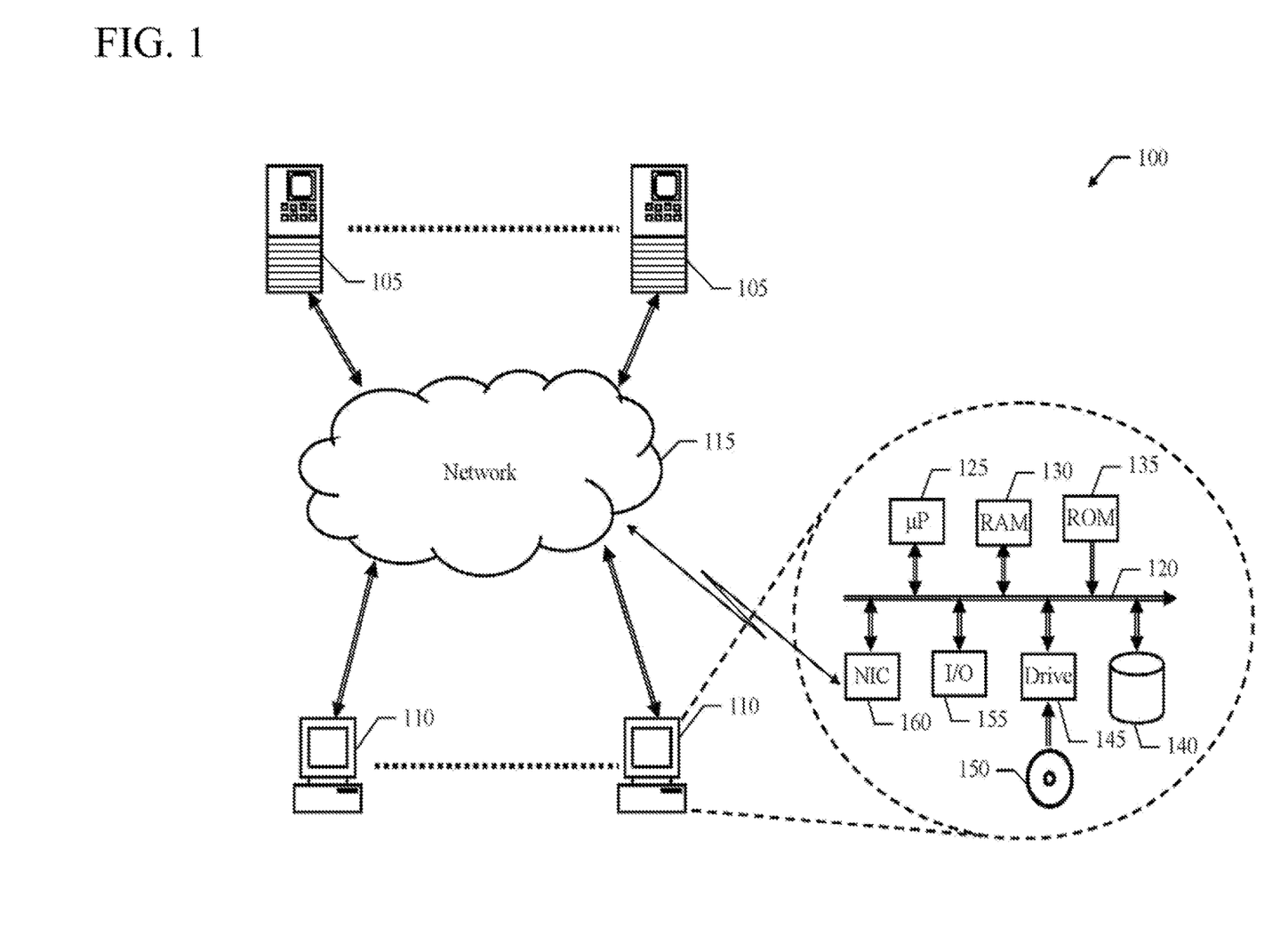
FIG. 1 shows a block-diagram of a data-processing system in which the solution according to an embodiment of the claimed subject matter may be applied, FIG. 2A

With reference in particular to the FIG. 1, a block-diagram is shown of a data-processing system 100 in which the solution according to an embodiment of the claimed subject matter may be applied.

The data-processing system 100 is based on a client/server model, wherein one or more server computing machines (or simply servers) 105 provide services to a plurality of client computing machines (or simply clients) 110. Typically, the data-processing system 100 has a distributed architecture with the servers 105 and the clients 110 that communicate among them over a network 115 (for example, Internet based). In the specific case at issue, some of the servers 105 operate as e-mail servers for accepting and transmitting outgoing (e-mail) messages and for receiving and delivering ingoing messages that are exchanged among users of the clients 110 (acting alternatively as senders and receivers, respectively, of the messages).

Such client 110 (for example, a PC) comprises several units that are connected in parallel to bus structure 120 (similar considerations apply to the servers 105, with a suitably scaled structure). In detail, one or more microprocessors (μP) 125 control operation of the client 110; a RAM 130 is used as a working memory by the microprocessors 125, and a ROM 135 stores basic code for as bootstrap of the client 110. Several peripheral units are further connected to the bus structure 120 (by means of respective interfaces). Particularly, a mass memory comprises one or more hard disks, computer-readable storage mediums, 140 and drives 145 for reading/writing optical disks 150 (for example, CDs or DVDs). Moreover, the client 110 comprises input/output units 155 (for example, a keyboard, a mouse and as monitor). A network adapter (Network Interface Card, or NIC) 160 is used to connect the client 110 to the network 115.

A pictorial representation of an exemplary application of the solution according to an embodiment of the claimed subject matter is shown in the FIG. 2A-FIG. 2D.

Figure 2A:
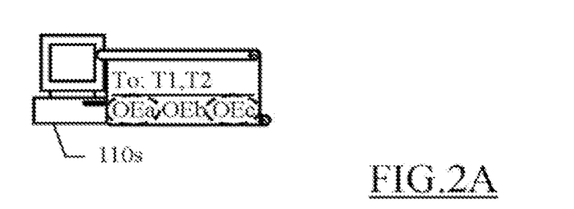

Starting from the FIG. 2A, a generic sender submits a message (for example, an e-mail) on its client, differentiated with the reference 110s; the message has a common content "OEa OEb OEc" (for example, a text in a body of the e-mail), to be conveyed to two different receivers T1 and T2 (for example, as indicated by their e-mail addresses in a header of the e-mail).

In the solution according to an embodiment of the claimed subject matter, the content of the message is parsed to identify an original expression therein, which matches one of a set of pre-defined concepts e.g. that may be difficult to convey. For example, in this case the original expressions "OEa" and "OEb" of the message "OEa OEb OEc" are identified as matching two concepts Ca and Cb, respectively.

Figure 2B:
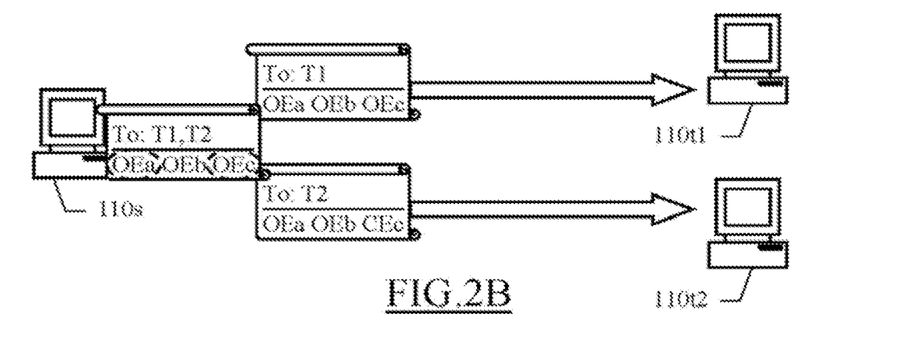

With reference now to FIG. 2B, the message is processed differently for the receiver. Particularly, a preferred expression of the matched concept is determined among the corresponding original expression and a set of candidate expressions pre-defined to express it; this operation is based on corresponding ratings of the (original and candidate) expressions that depend on the receiver, which ratings provide a quantitative measure or representation of an expected understanding of the expressions by the receiver. For example, in this case the preferred expressions of the concepts Ca and Cb are the original expression "OEa" and the original expression "OEc", respectively, for the receiver T1 and the original expression "OEa" and a candidate expression "CEe", respectively, for the receiver T2.

The original expression is then replaced according to the corresponding preferred expression for the receiver, so as to obtain a processed message specific for him/her. Particularly, in the example at issue the processed message for the receiver T1 will be exactly the same as the (original) message "OEa OEb OEc", whereas the processed message for the receiver T2 will be "OEa OEb OEc" (as obtained by replacing the original expression "OEc" with its preferred expression "CEc").

At this point, the processed message is sent to the corresponding receiver. Particularly, in the example at issue the processed message "OEa OEb OEc" is sent to the receiver T1 and the processed message "OEa OEb CEc" is sent to the receiver T2; each receiver T1 and T2 then receives the corresponding, processed message on his/her client, differentiated with the references 110t1 and 110t2, respectively.

For example, a message to be sent by a security manager to all the employees of a company may be "Bring product X to last level". The message may remain as is for staff people of the security manager that participated in the decision of corresponding maintenance operations to be performed, so that they already know its meaning. On the other hand, the message has to be updated for all the other people for which it would be incomprehensible. Particularly, the message may be updated for technical people by indicating the maintenance operations to be performed, for example, "Please apply patch y to product X"; the message may instead be updated for non-technical people by specifying detailed instructions for performing these maintenance operations, for example, "Please perform the following operations to upgrade product X: operation Ay, operation By, operation Cy, operation Dy and operation Ey".

The above-described solution makes the messages more effective in conveying the desired information to their receivers. Indeed, this technique facilitates the understanding by the receiver of the actual significance of the messages (as intended by their sender users). Particularly, the use of differentiated versions of the messages for the receivers alleviate the difficulties that may be caused by different interpretation of some expressions.

For example, in this way it is possible to replace (with more meaningful expressions) specialist expressions for receivers without the skills required to understand them, jargon expressions for receivers alien to the corresponding fields, context-depending expressions for receivers without any relationship to the corresponding situations or environments, short expressions for receivers without the required background, and ambiguous expressions for receivers that may understand them in different ways.

All of the above increases the likelihood that the messages generate the desired effects for which they were written (and particularly it reduces the risks of causing undesired effects).

Moreover, this solution limits the requests of clarifications and the corresponding responses, with saving of time and improved user satisfaction; moreover, the number of messages that are sent (and saved) may be reduced.

The above-mentioned advantages are clearly perceived in modern communication applications; indeed, this provides a better effectiveness of the messages (even when they are sent to a high number of heterogeneous receivers), without substantially affecting the simplicity of use of the communication applications.

Figure 2C:
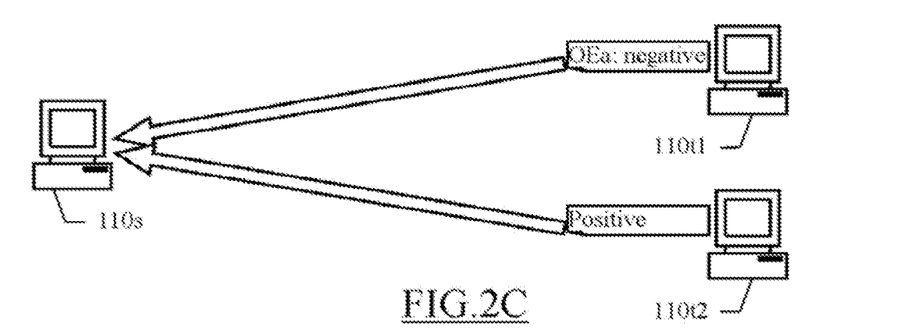

In an embodiment of the claimed subject matter, as shown in the FIG. 2C, the receiver also returns an understanding feedback for the corresponding processed message to the sender user. For example, in this case the receiver T1 returns a negative feedback for the expression "OEa" in the processed message "OEa OEb OEc", wherein the receiver T2 returns a positive feedback fir the whole processed message "OEa OEb CEc".

The understanding feedbacks can be used to determine the ratings of the expressions for next messages. For example, moving to the FIG. 2D, the same sender submits another message "OEa OEd" to be sent the receiver T1 again. As above, the original expression "OEa" of the message "OEa OEd" is identified as matching the concept Ca. However, the preferred expression of the concept Ca for the receiver T1 is now determined to be a candidate expression "CEa" (which rating now indicates a better expected understanding, in view of the negative understanding feedback of the original expression "OEa").

Figure 2D:
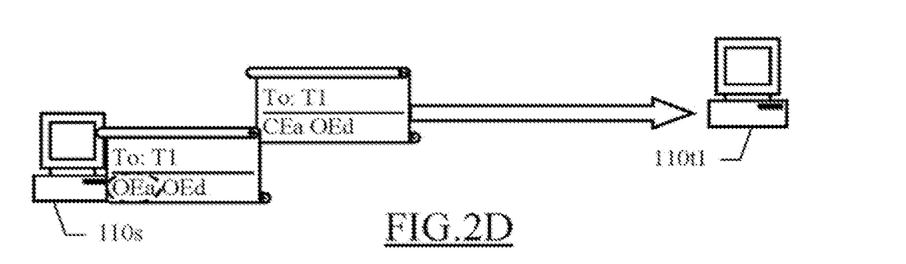
-FIG. 2D shows a pictorial representation of an exemplary application of the solution according to an embodiment of the claimed subject matter.

Therefore, as shown in the FIG. 2D, the original expression "OEa" is replaced (in the message "OEa OEd") with the corresponding preferred expression "CEa", so as to obtain a processed message "OEa CEd" for the receiver T1, which is then sent thereto.

For example, in the above-mentioned scenario a technical person may return a negative feedback fir the message "Please apply patch y to product X" since she does not known this product. Therefore, if a similar message is to be sent later on to the same person (for example, "Please apply patch z to product X"), it will be updated by specifying the detailed instructions for performing the corresponding maintenance operations (i.e., "Please perform the following operations to upgrade product X: operation Az, operation Bz, operation Cz, operation Dz and operation Ez").

In this way, the described solution self-adapts to the actual knowledge of the receivers; this allows obtaining better and better results over time.

Figure 3:
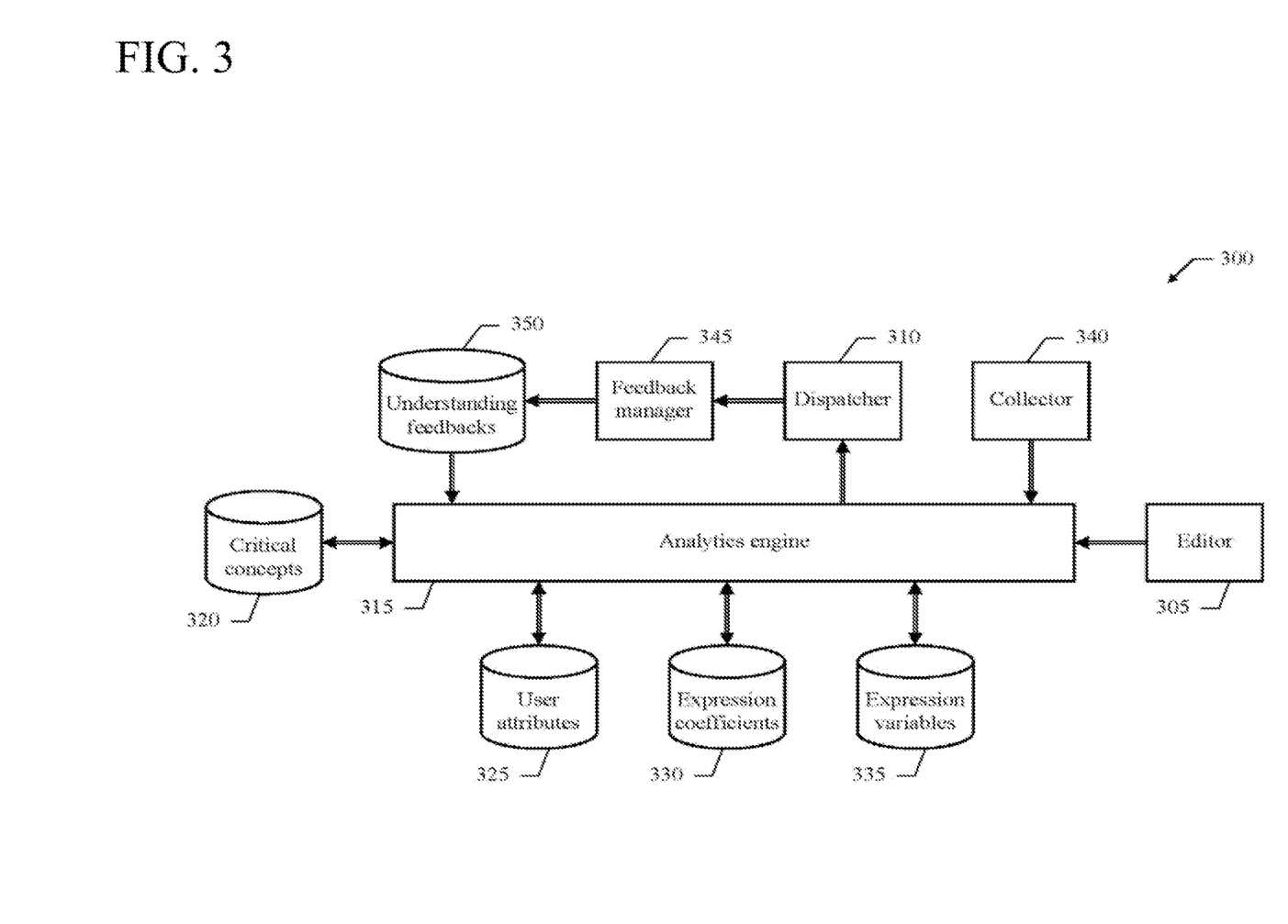
FIG. 3 shows the main software components that may be used to implement the solution according to an embodiment of the claimed subject matter.

The main software components that may be used to implement the solution according to an embodiment of the claimed subject matter are shown in the FIG. 3.

The information (programs and data) is typically stored in the hard disk and loaded (at least partially) into the working memory of a generic client when the programs are running, together with an operating system and other application programs (not shown in the figure). The programs are initially installed onto the hard disk, for example, from optical disks. In this respect, each component may represent a module, segment or portion of code, which comprises one or more executable instructions for implementing the specified logical function (or more).

Particularly, a whole Mail User Agent (MUA), also known as e-mail client or reader, is denoted as a whole with the reference 300. The (mail) user agent 300 is used to manage the messages locally on the client. With reference only to its functionalities being relevant for the present description, the user agent 300 comprises an editor 305 that is used to compose and submit messages to the sent to desired receivers. The editor 305 passes each submitted message to a dispatcher 310, which connects to the server offering the e-mail service (not shown in the figure) and dispatches the message thereto, for its forwarding to the corresponding receivers as soon as available.

In the solution according to an embodiment of the claimed subject matter, an analytics engine 315 bridges between the editor 305 and the dispatcher 310. The analytics engine 315 intercepts the message provided by the editor 305 (for example, with hooking techniques), processes it as described above, and then passes the corresponding processed message to the dispatcher 310.

For this purpose, the analytics engine 315 controls a repository 320 storing a definition of the one or more concepts (such as in terms of its candidate expressions).

Moreover, the analytics engine 315 controls a repository 325 storing user attributes indicative of characteristics of known receivers (such as in terms of values assigned to corresponding parameters for the receiver); for example, the user attributes may represent education, skills, job, department, and the like of the receivers.

The analytics engine 315 also controls a repository 330 storing expression coefficients, which represent an expected understanding of expression attributes, indicative of characteristics of the concepts, according to the user attributes (such as in terms of values assigned to corresponding parameters for the value of the user attributes). An example of expression characteristic is the type of words that are used in the expressions: in this case, the repository 330 may comprise a list of keywords, each one associated with different values of its expression coefficient for corresponding user attributes or combinations thereof. For example, the expression coefficient of a jargon keyword may be assigned a high value for user attributes indicative of corresponding skills or a low value otherwise (such as "patch" for software engineers and lawyers, respectively). Another example of expression characteristic is a format of the expressions; in this case, the repository 330 may comprise a definition of different formats (such as in terms of arrangements of corresponding keywords), each one associated with different values of its expression coefficient for corresponding user attributes or combinations thereof. For example, the expression coefficient of a short format may be assigned a high value for user attributes indicative of a corresponding background or a low value otherwise (such as the simple indication of applying a patch and its detailed explanation again for software engineers and lawyers, respectively).

In addition, the analytics engine 315 controls a repository 335 storing pre-defined values of expression variables that may be used in the candidate expressions of the concepts; for example, the expression variables may represent instructions for applying a patch, indications for reaching a destination, and the like.

The analytics engine 315 exploits a collector 340 for collecting information from external sources. Particularly, this information may be used to define the candidate expressions of the concepts, it may be used to set the user attributes of the receivers, and it may be used to define the expression variables. Examples of these external sources may be social networks and company directories for the first case, and digital libraries and wiki sites for the second and the third cases.

A feedback manager 345 receives the understanding feedback returned to the dispatcher 310 by the receivers of previous processed messages (such as in terms of the values of an index for one or more selected expressions thereof). The feedback manager 345 logs the understanding feedback into a corresponding repository 350, which is accessed by the analytics engine 315.

Figure 4A:
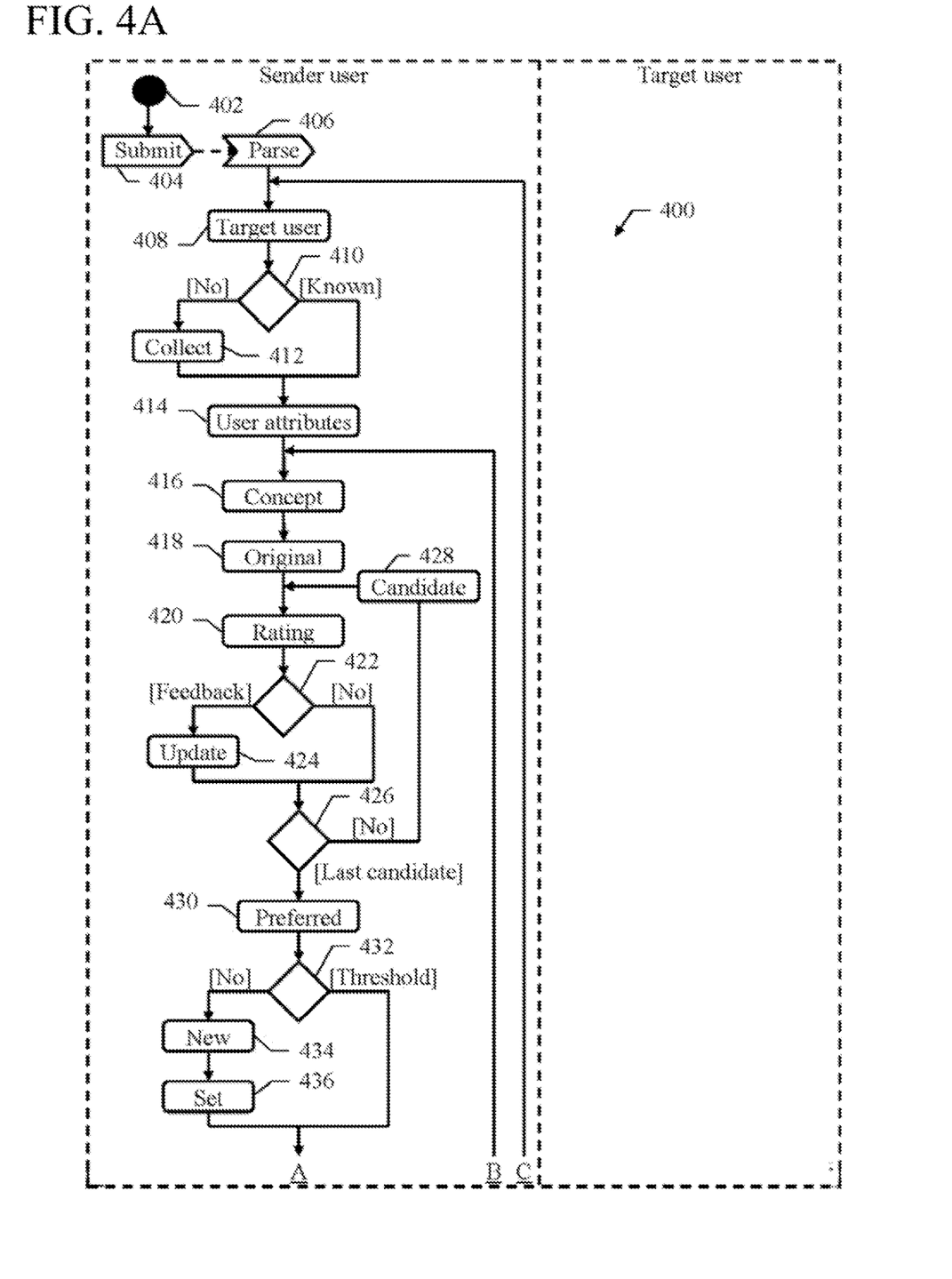
FIG. 4A-FIG. 4B show an activity diagram describing the flow of activities relating to an implementation of the solution according to an embodiment of the claimed subject matter.
Figure 4B:
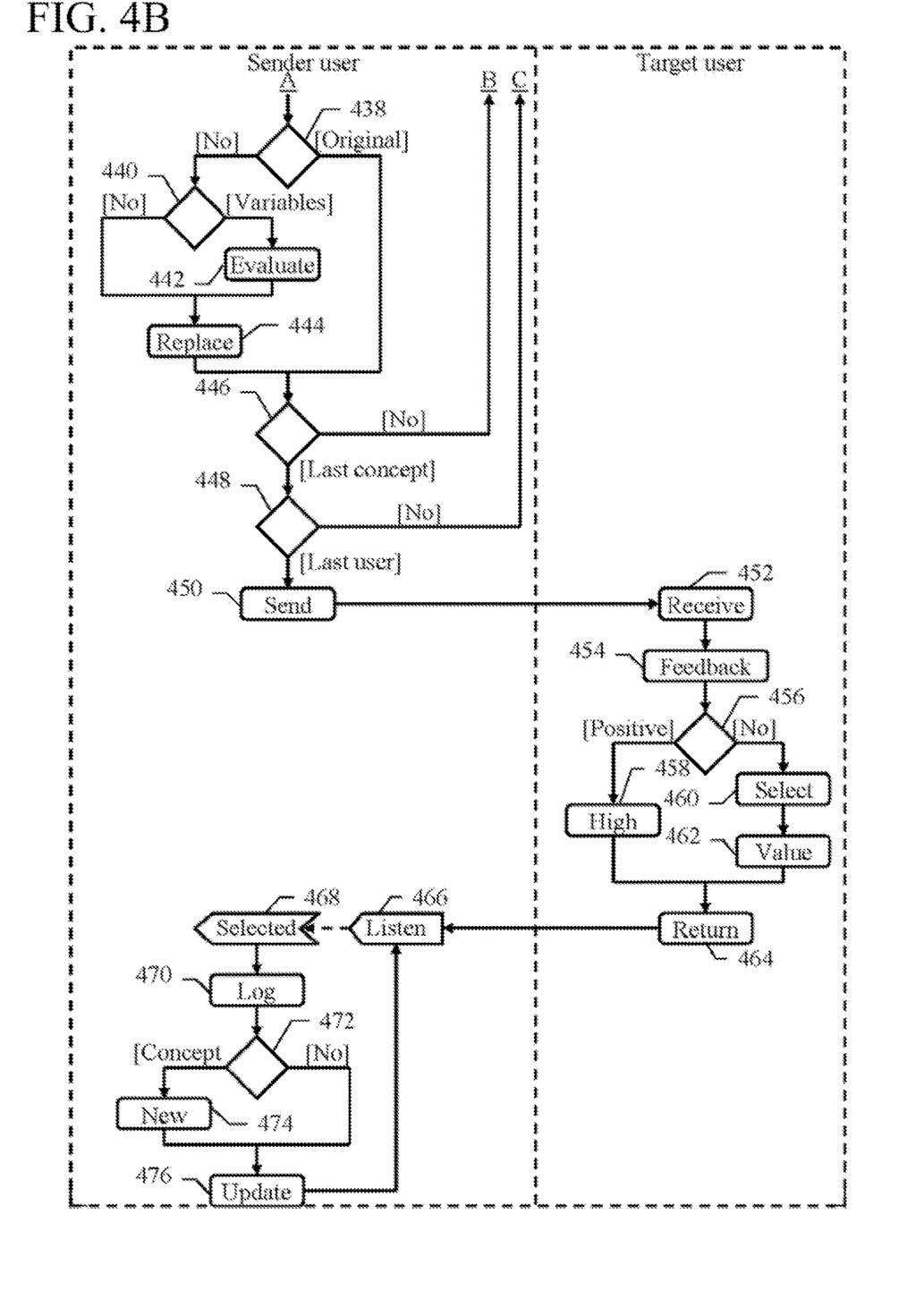

An activity diagram describing the flow of activities relating to an implementation of the solution according to an embodiment of the claimed subject matter is shown in the FIG. 4A-FIG. 4B. In this respect, the block may represent one or more executable instructions for implementing the specified logical function (or more) on the relevant computing machine(s).

Particularly, the diagram represents an exemplary process that may be used to manage the sending of messages by a generic sender to one or more receivers (on corresponding clients) with a method 400. The method 400 begins at the start circle 402 and then passes to block 404 in the column of the client of the sender as soon as a new message is submitted.

In response thereto, the message is parsed at block 406 to identify the original expressions thereof matching corresponding concepts. For example, when the concept is defined by its candidate expressions, the original expression in the message is compared semantically with every candidate expressions such as with ontology alignment techniques); when the semantic difference between the original expression and the closest candidate expression is below a predefined threshold (indicative of marginal differences in their meanings), the original expression is deemed to match the corresponding concept.

A loop is then repeated for processing the message for the receiver. The loop begins at block 408 for a (current) receiver, starting from the first one. A test is now performed at block 410 to verify whether the receiver is already known (i.e., s/he is defined in the repository of the user attributes). If not, meaning that this is the first time that a message is sent to this receiver, the corresponding use attributes are collected from the relevant external sources and saved at block 412 in the corresponding repository (by creating a new entry for the receiver). The process then continues to block 414; the same point is also reached directly from the block 410 when the receiver is already known (so that his/her user attributes are already available). In both cases, the user attributes of the receiver are retrieved from the corresponding repository.

A further loop is then repeated for analyzing the matched concept of the message. The loop begins at block 416 for a (current) matched concept, starting from the first one. The following operations are then performed for calculating the rating of the (original and candidate) expression of the matched concept for the receiver. Particularly, at first the original expression is taken into account at block 418.

Continuing to block 420, the expression attributes of this (current) expression are determined (for example, its keywords and format); for the expression attribute, the expression coefficient corresponding to the user attributes of the receiver is retrieved. The rating of the expression is calculated according to these expression coefficients (for example, by evaluating a semantic function passing them as input parameters). A test is then made at block 422 to verify whether an understanding feedback from the receiver is available for one or more selected expressions corresponding to the expression at issue. If so, the rating of the expression is updated at block 424 according to the available understanding feedbacks (for example, by resetting it to a null value when similar selected expressions received a negative feedback from the receiver in the past). The process then continues to block 426; the same point is also reached directly from the block 422 when no understanding feedback from the receiver is available for the expression. A test is made to verify whether all the candidate expressions of the matched concept have been taken into account. If not (as always true at the beginning), the process passes to block 428, wherein a next candidate expression of the matched concept is taken into account (starting from the first one). The flow of activity then returns to block 420 to repeat the same operations described above for calculating its rating.

Conversely, once the ratings of all the (original and candidate) expressions of the matched concept have been calculated, the process descends from the block 426 into block 430. At this point, the preferred expression of the matched concept is determined among its original expression and candidate expressions according to their ratings; for example, the preferred expression is set to the (original or candidate) expression having the highest rating when it exceeds the rating of the original expression by a predefined threshold (indicative of a significant understanding improvement), or it is set to the original expression otherwise.

A test is then made at block 432 to verify whether the rating of the preferred expression reaches a predefined (understanding) threshold, indicative of a minimum acceptable level of understanding. If not, a new candidate expression for the matched concept is created at block 434 (and it is added to its definition); the new candidate expression is defined so as to have its rating for the receiver (calculated as above) exceeding the understanding threshold. For example, the new candidate expression is defined manually, with the help of the available external sources, with an iterative process until the desired rating is obtained. The new candidate expression is set as the preferred expression of the matched concept for the receiver at block 436.

The process then descends into block 438; the same point is also reached directly from the block 432 when the rating of the preferred expression already reaches the understanding threshold. At this point, the flow of activity branches according to the preferred expression that has been selected. Particularly, if the preferred expression is different from the original expression (i.e., it is one of the candidate expressions of the matched concept), a test is made at block 440 to verify whether the preferred expression comprises one or more expression variables (for example, defined, by a reserved keyword). If so, the expression variable of the preferred expression is evaluated at block 442; for this purpose, different modes may be supported for determining the value of the expression variable (which value is then used to replace the expression variable in the preferred expression). Particularly, the expression variable may be defined to depend on the content of the original expression; in this case, the original expression is analyzed semantically to identify a sentence thereof that is most likely to have the same meaning of the expression variable (which sentence is then assigned to the expression variable). For example, the preferred expression may comprise an expression variable [product_name] for the name of a product on which some maintenance operations have to be performed ("Please apply patch y to product [product_name]"); the original expression ("Bring product X to last level") is parsed to find the actual name of the product ("X"), which is then used to replace the expression variable in the preferred expression ("Please apply patch y to product X"). Moreover, the expression variable may be defined to prompt the sender to enter its value at run-time. For example, the preferred expression may comprise an expression variable [patch_name] for the name of a patch to the applied to the product ("Please apply patch [patch_name] to product X"); the sender enters the actual name of the patch ("y"), which is then used to replace the expression variable in the preferred expression ("Please apply patch y to product X"). The expression variable may also be defined to retrieve, possibly according to the values of one or more other expression variables, its value from the corresponding repository (to which it is added, after its manual definition with the help of the available external sources, when it is not available yet). For example, the preferred expression may comprise an expression variable [instructions] for the detailed instructions of the maintenance operations to be performed ("Please perform the following operations to upgrade product X: [instructions]); the repository of the expression variables is queried to extract the actual definition of these instructions for the patch "y" ("operation Ay, operation By, operation Cy, operation Dy and operation Ey"), which is then assigned to the expression variable in the preferred expression ("Please perform the following operations to upgrade product X: operation Ay, operation By, operation Cy, operation Dy and operation Ey"). In this way, the candidate expressions of the concepts may be defined in general terms (independently of contingent details), and then contextualized for different specific situations in real-time.

The process then descends into block 444; the same point is also reached directly from the block 440 when the preferred expression does comprise any expression variable. At this point (preferably alter the sender has accepted the preferred expression, possibly modified manually), the original expression is replaced with the preferred expression (for the receiver) in the message. Continuing to block 446, which is also reached directly from the block 438 when the preferred expression is the same as the original expression (so that no operation has to be performed on the message), a test is made to verify whether the last matched concept has been analyzed. If not, the process returns to the block 416 to repeat the same operations on a next matched concept. Conversely, a further test is made at block 448 to verify whether the message has been processed for the last receiver. If not, the process returns to the block 408 to repeat the same operations for a next receiver.

Conversely, the loop is exit by descending into block 450. At this point, the processed messages so obtained for the receivers are sent thereto; for example, for this purpose an outgoing message is created fir the different version of the processed messages, which outgoing message is addressed to the receiver having this version of the processed message.

Moving now to block 452 in the swim-lane of the client of a generic receiver, s/he receives the corresponding processed message and then opens it. The receiver is prompted at block 454 to enter the understanding feedback for the processed message (for example, when she closes, forwards or replies to the processed message). At this point, the flow of activity branches at block 456 according to the provided understanding feedback. Particularly, if the understanding feedback is positive (meaning that the receiver has understood the processed message without any problem) a high value is assigned to it for the whole processed message at block 458. Conversely, the receiver is prompted at block 460 to select one or more expressions that are not deemed effective (for example, because they are not clear or with superfluous details). The receiver then enters a corresponding (lower) value of the understanding feedback for the selected expression at block 462 (for example, within a predefined scale). The flow of activity merges again at block 464, from either the block 458 or the block 462; at this point, the understanding feedback so defined is returned to the sender user.

The sender is listening for any understanding feedbacks at block 466 in the corresponding swim-lane. As soon as an understanding feedback is received (from a receiver to which a processed message was previously sent), a loop is repeated for the selected expression of the processed message, considering as such all the preferred expressions thereof when the understanding feedback is positive for the whole processed message.

The loop begins at block 468 for a (current) selected expression, starting from the first one. Continuing to block 470, the understanding feedback of the selected expression is logged for the receiver. A test is then made at block 472 to verify whether the selected expression matches one of the concepts; this is always true when the selected expression is a preferred expression of the processed message, whereas it is verified as described above otherwise. If not, a new concept defined by the selected expression (assigned as its candidate expression, possibly after replacing one or more sentences thereof with corresponding expression variables) is created and added to the corresponding repository at block 474. The process then continues to block 476; the same point is also reached directly from the block 472 when a matched concept for the selected expression is found. At this point, the expression coefficients of the candidate expression corresponding to the selected expression, for the user attributes of the receiver (retrieved from the corresponding repository), are updated according to the understanding feedback (such as by increasing or decreasing them when the understanding feedback is positive or negative, respectively); for example, a negative feedback for a selected expression received from a receiver of a specific department reduces the expression coefficients of the corresponding candidate expression for that department. The process then returns to the block 466 waiting for a next understanding feedback.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the claimed subject matter may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method operations described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should he intended as a non-exclusive relationship (i.e., with possible further variables involved), and the term a/an should be intended as one or more items (unless expressly indicated otherwise).

For example, an embodiment of the claimed subject matter provides techniques for sending messages on a data-processing system. A message is submitted to be sent from a sender to a set of (one or more) receivers. The message is parsed to identity the original expression therein, which matches an indication of one of a set of (one or more) pre-defined concepts. For the receiver, a preferred expression is determined of the matched concept, among the corresponding original expression and a set of (one or more) candidate expressions pre-defined to express the matched concept, according to a rating thereof representing an expected understanding by the receiver. The message is processed for the receiver by replacing the original expression according to the corresponding preferred expression for the receiver. The processed message is then sent to the corresponding receiver.

However, the messages may of any type (for example, instant messages, SMSs, web-conference submissions, forum posts, and the like), and they may be used in any context (for example, for personal, business, marketing or informative purposes). The (original and candidate) expressions may be of any type (from simple words to complete sentences). The original expressions matching the concepts and their preferred expressions may be determined in any way (for example, with fuzzy-logic techniques, or asking the sender to select them from a list of suggested alternatives in decreasing order of their ratings); the ratings may be calculated and used for this purpose in any way (see below). The preferred expressions may be defined and used in any way to replace the corresponding original expressions (for example, by simply adding additional text thereto). The processed messages may be sent to the corresponding receivers in any way (for example, individually to the one of them).

In an embodiment of the claimed subject matter, the method further comprises receiving an indication of an understanding feedback for at least part of preceding processed messages from at least part of the corresponding receivers; at least part of the corresponding understanding feedbacks is used for calculating, the rating of the original expression and candidate expression.

However, the understanding feedbacks may be defined and used for this purpose in any way (see below); in any case, this feature may also be omitted in a basic implementation.

In an embodiment of the claimed subject matter, the determining, for the receiver, a preferred expression of the matched concept comprises calculating the rating of the corresponding original expression and candidate expression according to one or more expression coefficients, which represent an expected understanding of an expression attribute thereof depending on the receiver.

However, the expression coefficients may be of any type (for example, in the form of simple flags), they may relate to any expression attribute (see below), and they may be used in any way to calculate the ratings (for example, by simply combining them linearly or as weights of synapses in a neural network); in any case, the ratings may be calculated in any other way (for example, with an inference engine).

In an embodiment of the claimed subject, matter, the expression attribute is defined by a set of (one or more) words and/or an arrangement thereof.

However, the expression attributes may be of different, alternative or additional type (for example, syntactical complexity indexes).

In an embodiment of the claimed subject matter, the calculating the rating of the corresponding original expression and candidate expression comprises determining a set of (one or more) user attributes of the receiver, and determining the expression coefficients of the original expression and candidate expression according to the user attributes of the receiver.

However, the user attributes may be of any type (for example, in the form of simple flags), they may relate to any characteristic of the receivers (for example, their location), and they may be provided in any way (see below); in any case, the expression coefficients may be determined in other ways for example, individually for the receiver instead of for categories thereof defined by their user attributes).

In an embodiment of the claimed subject matter, the calculating the rating of the corresponding original expression and candidate expression comprises collecting information for defining the user attributes of the receiver from a set of (one or more) external sources.

However, the external sources may be of any type (for example, search engines); in any case, the user attributes may be provided in other ways (for example, entered manually).

In an embodiment of the claimed subject matter, the receiving an indication of an understanding feedback for at least part of preceding processed messages from at least part of the corresponding, receivers comprises receiving an understanding feedback for the one of a set of (one or more) selected expressions of a preceding processed message from a corresponding receiver; the using at least part of the corresponding understanding feedbacks for calculating the rating of the original expression and candidate expression comprises using the understanding feedback of the selected expression to update the expression coefficients of the candidate expression corresponding thereto.

However, the understanding feedback may be of other type (for example, a simple dichotomy value), and it may relate to any part of the processed message (from individual words thereof to its whole content); in any case, the understanding feedback may be used in other ways to calculate the ratings (for example, to train a corresponding neural network).

In an embodiment of the claimed subject matter, the using at least part of the corresponding understanding feedbacks for calculating the rating, of the original expression and candidate expression comprises verifying whether the selected expression matches one of the concepts, and defining a new concept for the selected expression matching none of the concepts (with the new concept that is associated with a new candidate expression corresponding to the selected expression).

However, the new concept may be defined in any way (for example, simply by the selected expression "as is"); in any case, the understanding feedbacks may be used to calculate the ratings in other ways (for example, only for selected expressions corresponding to already defined concepts).

In an embodiment of the claimed subject matter, the determining, for the receiver, a preferred expression of the matched concept comprises updating the rating of the original expression and candidate expression according to at least part of the understanding feedbacks or the selected expression corresponding, thereto being received from the receiver.

However, the ratings may be updated in any way (for example, by applying a correction factor corresponding to the understanding feedbacks); in any case, the understanding feedbacks may be used to update only the ratings, only the expression attributes, or none of them (for example, by calculating the ratings directly from the understanding feedbacks).

In an embodiment of the claimed subject matter, the determining, for the receiver, a preferred expression of the matched concept comprises creating a further new candidate expression for the matched concept in response to no rating of the corresponding original expression and candidate expressions for the receiver reaching an understanding threshold (with the rating of the further new candidate expression that reaches the understanding threshold), and setting the further new candidate expression as the preferred expression.

However, the understanding threshold may have any value; in any case, this additional feature may also be omitted.

In an embodiment of the claimed subject matter, the creating a further new candidate expression comprises collecting information for defining the further new candidate expression from a set of (one or more) further external sources.

However, the external sources may be of any type (for example, previous messages received from the receiver); in any case, the further new candidate expression may be defined in other ways (for example, simply manually).

In an embodiment of the claimed subject matter, the determining, for the receiver, a preferred expression of the matched concept comprises evaluating a set of (one or more) expression variables of the preferred expression.

However, the expression variables may be evaluated in any way (see below); in any case, this feature may also be not supported in a basic implementation.

In an embodiment of the claimed subject matter, the evaluating a set of expression variables of the preferred expression comprises evaluating the expression variables according to the corresponding original expression, to information entered by the sender and/or to information collected from a set of (one or more) still further external sources.

However, different, alternative or additional ways may be provided for evaluating the expression variables (for example, front the original expression only, from the entered information only, from any other external source (such as search engines), from previous similar messages, or from any combination thereof).

Generally, similar considerations apply if the same solution is implemented with an equivalent method (by using similar steps with the same functions of more steps or portions thereof, removing some steps being nonessential, or adding further optional steps); moreover, the steps may be performed in a different order, concurrently or in an interleaved way (at least in pail).

A further embodiment of the claimed subject matter provides a computer program comprising code means for causing a computing machine to perform the steps of the above-described method when the computer program is executed on the computing machine.

A further embodiment of the claimed subject matter provides a computer program product comprising a non-transitory computer readable medium embodying a computer program, the computer program comprising code directly loadable into a working memory of a computing machine thereby configuring the computing machine to perform the same method.

However, the above-described solution may be implemented as a stand-alone module, as a plug-in for the agent, or even directly in the agent of the client; alternatively, it may be implemented in the server providing the corresponding service (or distributed among the server and the clients). As will be appreciated by one skilled in the art, aspects of the claimed subject matter may be embodied as a system, method or computer program product. Accordingly, aspects of the claimed subject matter may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the claimed, subject matter may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the claimed subject matter may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the claimed subject matter have been described with reference to flowchart illustrations and/or block, diagrams of methods, apparatus (systems) and computer program products according to embodiments of the claimed subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also he loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment of the claimed subject matter provides a system comprising means for performing the above-described method.

However, this method may also be carried out on a system based on a different architecture (for example, a local, wide area, global, cellular or satellite network), and exploiting any type of (wired and/or wireless) connections. However, its implementation on virtual machines of a stand-alone computer is not excluded.

Generally, similar considerations apply if the system has a different structure or comprises equivalent components, or it has other operative characteristics. In any case, every component thereof may be separated into more elements, or two or more components may be combined together into to single element moreover, each component may be replicated to support the execution of the corresponding operations in parallel. Moreover, unless specified otherwise, any interaction between different components generally does not need to be continuous, and it may be either direct or indirect through one or more intermediaries.

We claim:

1. An apparatus for sending a message on a data-processing system, the apparatus comprising:
    a plurality of processors;
    a non-transitory computer-readable storage medium coupled to the plurality of processors; and
    logic, stored on the computer-readable storage medium and executed on the plurality of processors, for:
        parsing an electronic mail (email) message, sent from a sender for delivery to at least one receiver of a plurality of receivers, to identify at least one original expression therein matching an indication of a pre-defined concept, wherein the receiver is an email user and original expression is a complete sentence;
        determining, for the receiver, a preferred expression of the matched concept, among the corresponding original expression and a set of candidate expressions pre-defined to express the matched concept, according to a rating representing an expected understanding by the receiver, wherein the preferred expression does not include the original expression, wherein the preferred expression is set to an expression having the highest rating representing an expected understanding by the receiver when exceeding the rating of the original expression by a predefined threshold compared to the set of candidate expressions and the preferred expression is not a translation between languages;
        processing the message for the receiver by replacing the original expression with the corresponding preferred expression for the receiver;
        sending the processed message to the corresponding receiver; and
        displaying the processed message to the user.

2. The apparatus according to claim 1, the logic further comprising logic for:
    receiving an indication of an understanding feedback for at least part of preceding processed messages from at least part of the plurality of receivers, and
    using at least part of the corresponding understanding feedbacks for calculating the rating of an original expression and candidate expression.

3. The apparatus according to claim 1, wherein the logic for determining, for the receiver, a preferred expression of the matched concept comprises logic for:
    calculating the rating of the corresponding original expression and candidate expression according to a set of expression coefficients representing an expected understanding of an expression attribute thereof depending on the receiver.

4. The apparatus according to claim 1, wherein the logic for determining, for the receiver, a preferred expression of the matched concept comprises logic for:
    creating a further new candidate expression for the matched concept in response to no rating of the corresponding original expression and candidate expressions for the receiver reaching an understanding threshold, the rating of the further new candidate expression reaching the understanding threshold; and
    setting the further new candidate expression as the preferred expression.

5. A computer programming product for sending a message on a data-processing system, the computer program product comprising a non-transitory computer-readable storage medium having program code embodied therewith, the program code executable by a plurality of processors to perform a method comprising:
    parsing an electronic mail (email) message, sent from a sender for delivery to at least one receiver of a plurality of receivers, to identify at least one original expression therein matching an indication of a pre-defined concept, wherein the receiver is an email user and original expression is a complete sentence;
    determining, for the receiver, a preferred expression of the matched concept, among the corresponding original expression and a set of candidate expressions pre-defined to express the matched concept, according to a rating representing an expected understanding by the receiver, wherein the preferred expression does not include the original expression, wherein the preferred expression is set to an expression having the highest rating representing an expected understanding by the receiver when exceeding the rating of the original expression by a predefined threshold compared to the set of candidate expressions and the preferred expression is not a translation between languages;
    processing the message for the receiver by replacing the original expression with the corresponding preferred expression for the receiver;

sending the processed message to the corresponding receiver; and displaying the processed message to the user.

6. The computer programming product according to claim 5, the method further comprising:

receiving an indication of an understanding feedback for at least part of preceding processed messages from at least part of the plurality of receivers, and using at least part of the corresponding understanding feedbacks for calculating the rating of an original expression and candidate expression.

7. The computer programming product according to claim 5, wherein the determining, for the receiver, a preferred expression of the matched concept comprises:

calculating the rating of the corresponding original expression and candidate expression according to a set of expression coefficients representing an expected understanding of an expression attribute thereof depending on the receiver.

8. The computer programming product according to claim 5, wherein the determining, for the receiver, a preferred expression of the matched concept comprises:

creating a further new candidate expression for the matched concept in response to no rating of the corresponding original expression and candidate expressions for the receiver reaching an understanding threshold, the rating of the further new candidate expression reaching the understanding threshold; and setting the further new candidate expression as the preferred expression.

* * * * *